United States Patent
Hampson et al.

[11] Patent Number: 6,152,122
[45] Date of Patent: Nov. 28, 2000

[54] COMBUSTION ENHANCING INSERT FOR CYLINDER OF AN INTERNAL COMBUSTION ENGINE

[75] Inventors: Gregory James Hampson, Clifton Park, N.Y.; Bertrand Dahung Hsu, San Jose, Calif.

[73] Assignee: General Electric Company, Schenectady, N.Y.

[21] Appl. No.: 09/263,548

[22] Filed: Mar. 8, 1999

[51] Int. Cl.[7] ...................................................... F02B 23/00
[52] U.S. Cl. .............................................................. 123/661
[58] Field of Search .................................. 123/661, 193.3

[56] References Cited

U.S. PATENT DOCUMENTS

4,909,230  3/1990  Kawamura ............................ 123/193.3

*Primary Examiner*—Marguerite McMahon
*Assistant Examiner*—Jason Benton
*Attorney, Agent, or Firm*—Patrick K. Patnode; Marvin Snyder

[57] ABSTRACT

A combustion enhancing insert for a cylinder of an internal combustion engine having a body shaped for insertion into the cylinder so as to partially occupy the squish area of the cylinder as well as the crevice area of the cylinder. The combustion enhancing insert also occupies part of the combustion area but does not interfere with valve flow. The combustion enhancing insert can be attached to the cylinder head, cylinder wall or made as part of the head gasket and can be formed as part of the cylinder inserted as a retrofit. The present invention will reduce the amount of unburned combustion gases collecting in the squish area and crevice area. Also, the compression ratio will be increased. This will result in better fuel efficiency with less deposits and emissions.

21 Claims, 6 Drawing Sheets

COMBUSTION ENHANCING INSERT FOR CYLINDER OF AN INTERNAL COMBUSTION ENGINE

BACKGROUND OF THE INVENTION

This invention relates to enhancing combustion in an internal combustion engine by means of a combustion enhancing insert in the cylinder that reduces the amount of unburned fuel that typically collects in the cylinder and allows for an increase in the compression ratio without increasing the piston height.

Figure 1:
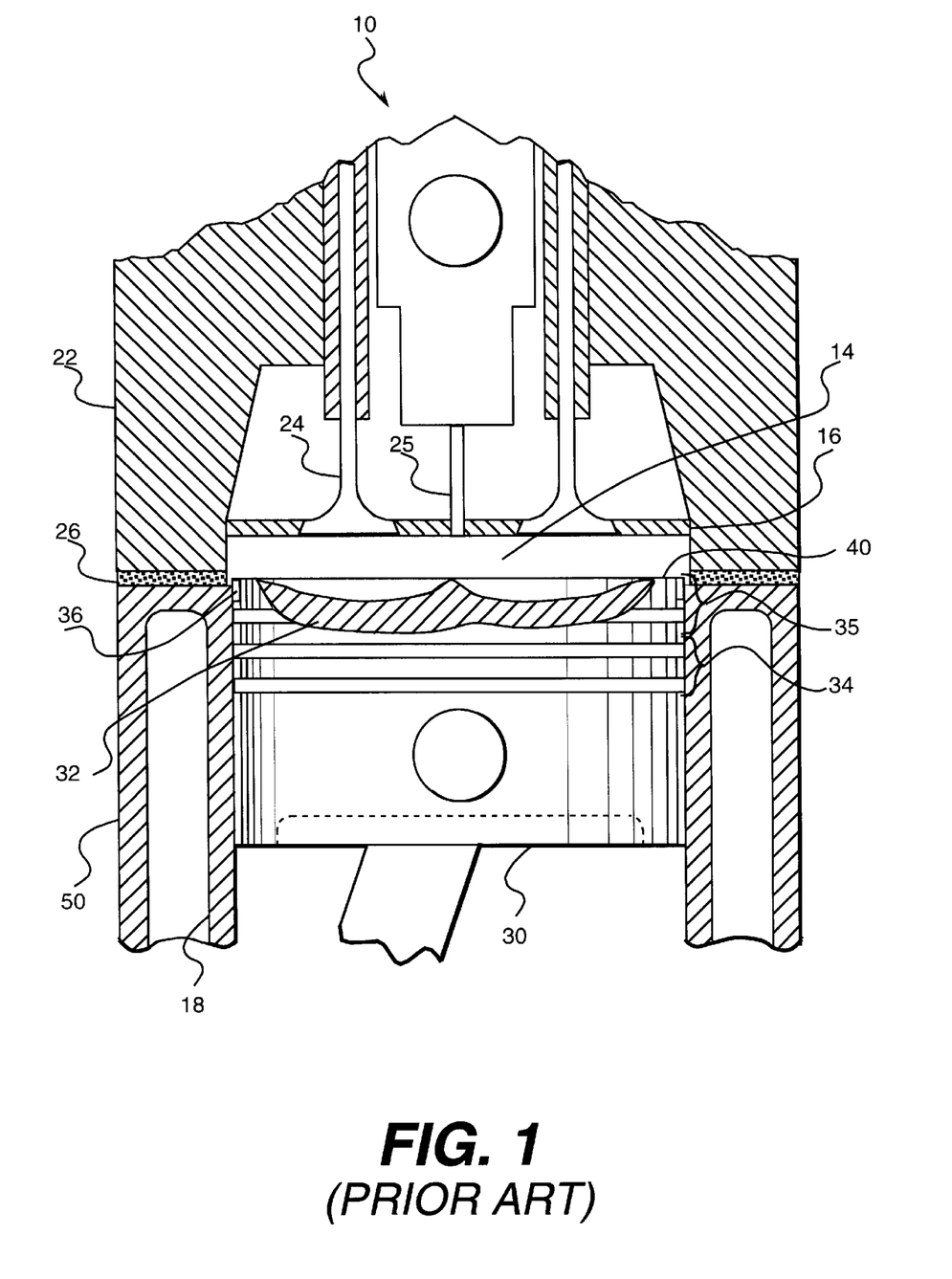
FIG. 1 is a cross-sectional view of a typical cylinder of an internal combustion engine of the prior art.

In internal combustion engines, a cylinder houses a reciprocating piston as shown in FIG. 1. As the piston moves up, fuel is sprayed into the combustion area that is compressed as the piston moves and combustion takes place. Combustion product gases are naturally directed toward the cylinder liner by the high velocity injected fuel. The gases at the front of the spray plume from the fuel injector are often only partially burned and contain the highest levels of soot, CO, and unburned hydrocarbons. High turbulence levels and high temperatures are usually necessary for the complete oxidation of these partially burned species. The high velocity injected fuel forces these gases toward the cylinder liner that is much cooler than the reacting gases in the combustion area in the piston bowl. This area near the liner where the gases collect, between the piston land and the cylinder head at the top of piston travel or "top dead center," is called the the "squish area."

Gases that collect in the squish area are a toll on fuel efficiency and emissions because more fuel needs to be burned to make up for the gas that collects in the squish area. Consequently, preventing gases from entering the squish area is beneficial to both low emissions and high fuel efficiency.

In addition, there is normally a gap between the piston and the liner called the "crevice area." The squish area and the crevice area combined is referred to herein as the "end gas area." The crevice area represents an unproductive area that increases heat loss and has a net effect of increase in production of emissions of Nox, smoke, soot, CO, and unburned hydrocarbons. The crevice area thus tends to be an area where soot particles collect in diesels and spark ignition engines. Soot particles in the crevice area may migrate to the engine lubricating oil and shorten the life of the oil while also shortening the life of the engine. Soot particles may also enhance deposit formation in the crevice area and on the top compression ring of the piston that leads to failure of the top compression ring and ultimately to loss of compression and oil control.

Compression ratio is defined as the volume between the piston and cylinder head at the bottom of piston travel over the volume between the piston and cylinder head at top dead center. Generally speaking, a high compression ratio is desirable in engines because a high compression ratio increases fuel efficiency. However, engines that have a low stroke/bore ratio do not have sufficient clearance between the piston and valves at top dead center to accomplish high compression ratios (16:1 or higher). As a result, it would be beneficial to accomplish high compression ratio without increasing the piston height.

One method of reducing the crevice area is to move the top compression ring higher toward the top of the piston land. However, this method leads to excessive ring temperatures and accelerated depositing on the top compression ring, which leads to failure of the top compression ring. Another method uses a scraper ring, a ring embedded in the cylinder liner that scrapes off deposits in the crevice area as the piston moves up and down. However, the scraper ring does not prevent gases from collecting in the squish area and does not allow for an increase in the compression ratio.

Therefore, it is apparent from above that there exists a need in the art for improvements in combustion within an internal combustion engine.

SUMMARY OF THE INVENTION

The present invention uses a combustion enhancing insert for a cylinder of an internal combustion engine. The cylinder has a cylinder head with at least one valve therein with an opening into the combustion area. The combustion enhancing insert comprises a body having an overall shape for insertion into the cylinder so as to at least partially occupy the squish area. The body of the combustion enhancing insert has an opening adjacent each valve for passage of gaseous materials through the valve into or out of the combustion area of the cylinder. The combustion enhancing insert may be formed with a ridge that fits into a recess in the cylinder wall. The combustion enhancing insert will also partially occupy the crevice area.

The present invention contemplates the combustion enhancing insert being formed as part of the engine, cylinder or head gasket. However, the combustion enhancing insert may also be inserted as a retrofit into an existing engine by merely removing the cylinder head, recessing the cylinder wall, and inserting the combustion enhancing insert.

The present invention will help to eliminate problems associated with unburned gases collecting in the squish area and crevice area since the combustion enhancing insert will take up the volume of those areas. Furthermore, the combustion enhancing insert will take up volume in the cylinder thus increasing the compression ratio. The result is better fuel efficiency as a result of the increased compression ratio and elimination of unburned gases in the squish area and crevice area.

DETAILED DESCRIPTION OF THE INVENTION

FIG. 1 shows a cross-sectional view of a typical cylinder 10 of an internal combustion engine with reciprocating piston 30 at top center. Cylinder 10 is a hollow area within an engine block 50. The top of piston 30 has a bowl-shaped center known as piston bowl 32 surrounded by a shoulder portion or piston land 40. On the outside of piston 30 are a series of compression rings 34 including a top compression ring 35. Cylinder 10 has a cylinder wall 18 on the outside that surrounds piston 30. Cylinder wall 18 can be either a cylinder liner that is placed inside cylinder 10 or the engine block itself. Cylinder 10 will also have a cylinder head 22 removably attached that closes cylinder 10 at the top.

The area between piston bowl 32 and cylinder head 22 is known as a combustion area 14. Cylinder head 22 has at least one valve 24 and usually has a set of valves 24 opening into combustion area 14. There is a fuel injector 21 housed within cylinder head 22. Fuel is directed from fuel injector 25 into combustion area 14 and is mixed with air from valve 24. This fuel and air mixture, which mixture is referred to as combustion gases, is burned in combustion area 14. It should be noted that the present invention will work for other types of internal combustion engines such as those using spark plugs.

The area between piston land 40 and cylinder head 22, surrounding combustion area 14, is known as a squish area 16. A crevice area 36 is formed between piston 30 and cylinder wall 18 above top compression ring 35. Squish area 16 and crevice area 36 combined is known as the end gas area.

Figure 2:
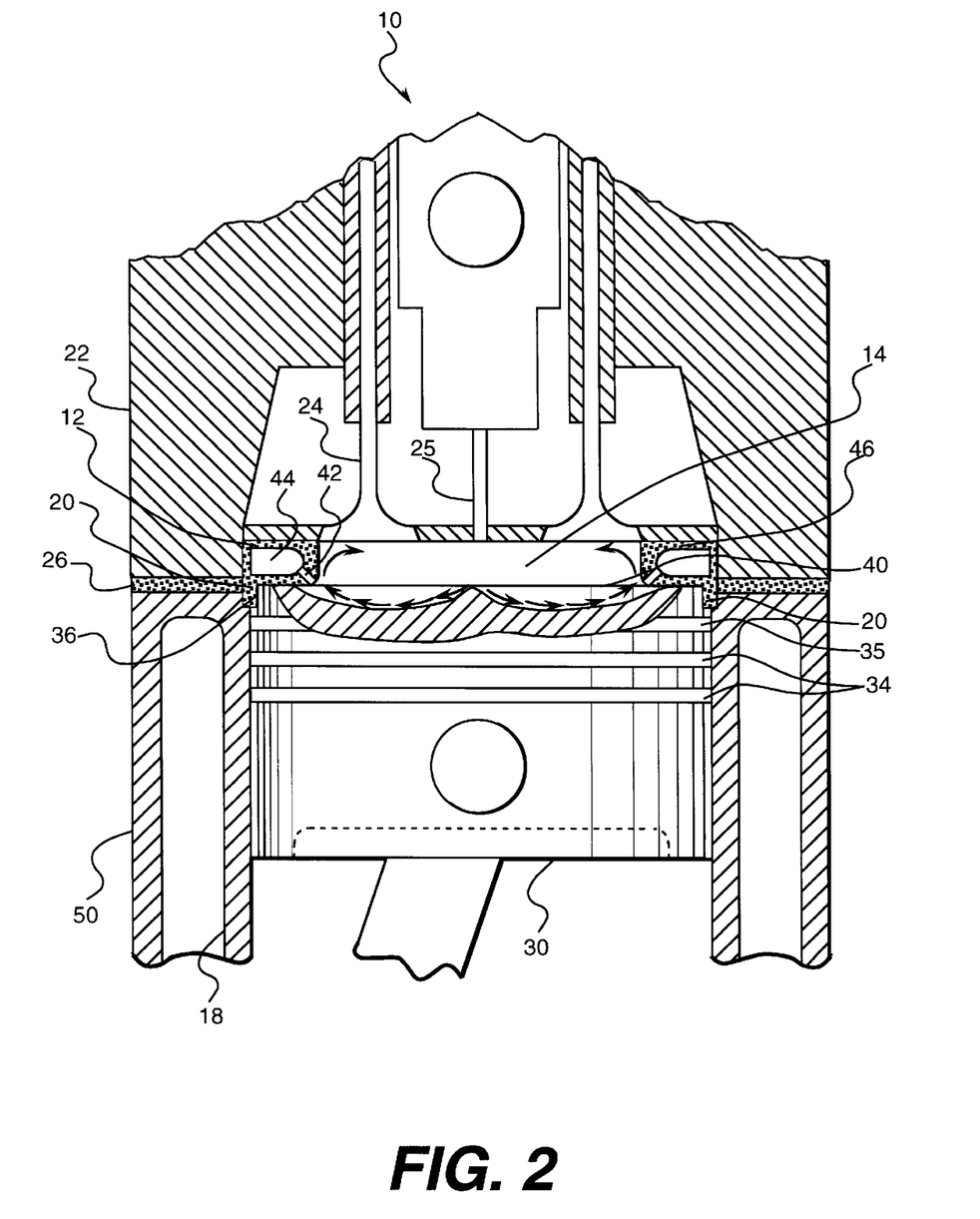
FIG. 2 is a cross-sectional view of a section of the cylinder of FIG. 1 incorporating the combustion enhancing insert according to a preferred embodiment of the present invention.
Figure 4:
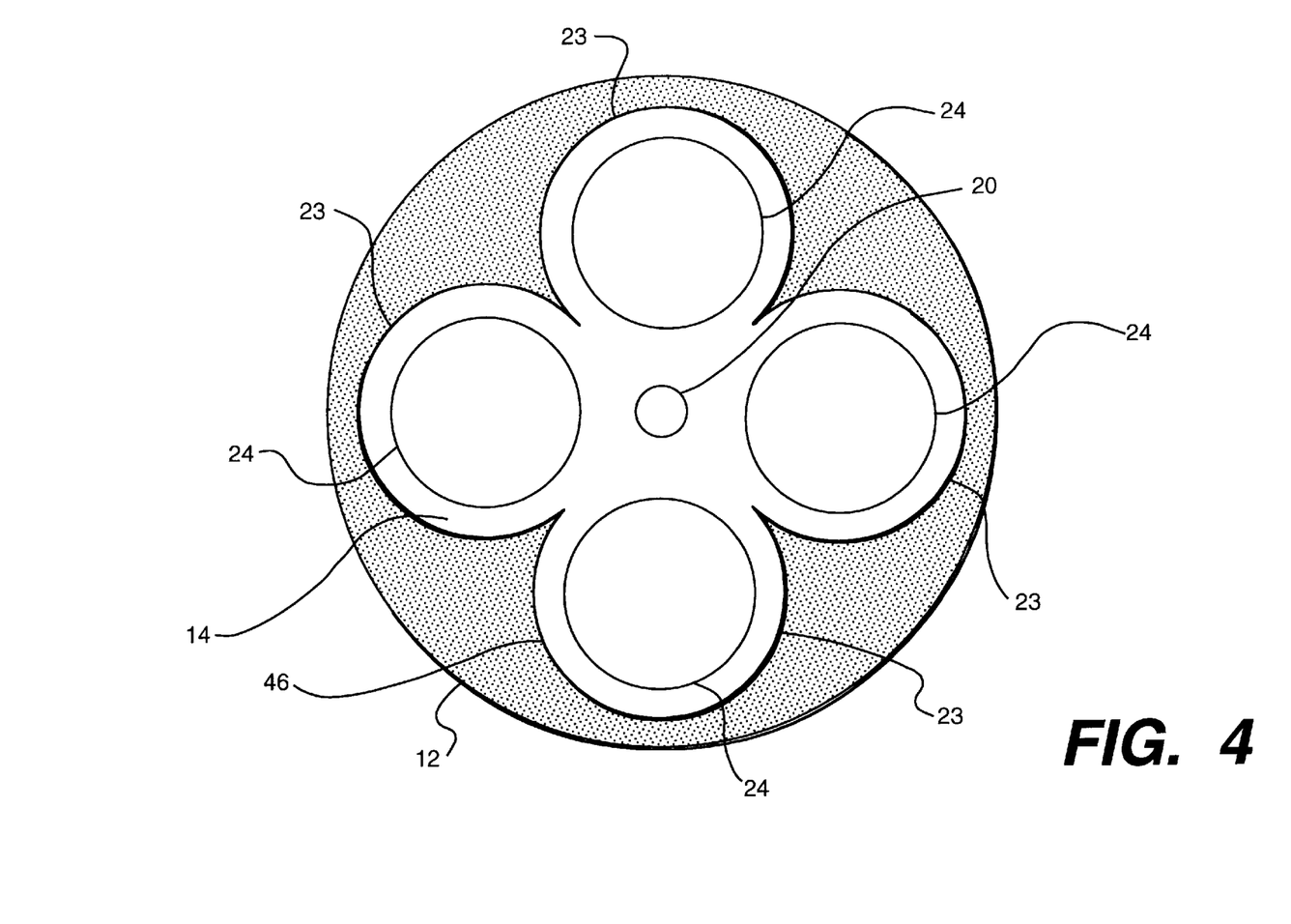
FIG. 4 is a bottom view of the combustion enhancing insert installed in a cylinder and viewed from the bottom of the cylinder.

FIG. 2 shows the cylinder of FIG. 1 incorporating the present invention. According to the present invention, cylinder 10 has a combustion enhancing insert 12. Combustion enhancing insert 12 comprises a body having an overall shape for insertion into cylinder 10 so as to at least partially occupy squish area 16. As such, combustion enhancing insert 12 will generally be circular in nature and will prevent combustion gases from entering squish area 16. As shown in FIG. 4, combustion enhancing insert 12 has at least one opening 23 adjacent each valve 24 for passage of gaseous material into or out of the combustion area 14. Combustion enhancing insert 12 is designed this way so as not to be blocking any of the gaseous materials to or from valve 24.

Referring again to FIG. 2, the present invention will result in an increase in compression ratio of cylinder 10 since the combustion enhancing insert 12 will decrease the volume. Such an increase in compression ratio will result in better fuel efficiency since combustion area 14 will be subject to higher pressure and higher temperatures, resulting in better combustion.

Combustion enhancing insert 12 is also shaped to at least partially occupy crevice area 36, thus reducing the amount of unburned combustion gases entering crevice area 36. This will increase the life of top compression ring 35 and will also increase efficiency and reduce emissions because an unproductive area is eliminated.

As shown in FIG. 4, combustion enhancing insert 12 is further shaped so as to partially extend into combustion area 14. Combustion enhancing insert 12 takes up as much volume in combustion area 14 as possible without interfering with valve flow or with combustion. As such, combustion enhancing insert 12 will usually take up the space in between the valves. This will further enhance combustion since combustion gases will remain in combustion area 14.

FIG. 2 shows a preferred embodiment of the present invention wherein combustion enhancing insert 12 has an inner chamber 44 formed within, which inner chamber 44 is in communication with combustion area 14 through at least one orifice 42. The purpose of inner chamber 44 is to enhance late cycle combustion, which is when piston 30 begins to move back down. As piston 30 begins to move down, volume increases and pressure and temperature decrease. Therefore, combustion gases that are in combustion area 14 at this time will have a tendency to only be partially burned. At top dead center, inner chamber 44 will have a pocket of high pressure gases inside that will be very similar to the pressure in combustion area 14. However, as piston 30 begins to move down, the pressure in inner chamber 44 will be much higher than the pressure in combustion area 14. As a result, the high pressure gases will jet out of inner chamber 44 through orifice 42 into combustion area 14, thereby serving to enhance combustion of the late cycle combustion gases. Inner chamber 44 may be an annular tunnel running around the entire combustion enhancing insert 44.

It is contemplated that combustion enhancing insert 12 could have only orifice 42 without inner chamber 44. In such a case, late cycle combustion would still be somewhat enhanced since high pressure gases would collect in orifice 42.

It is preferred that orifice 42 be directed towards the piston bowl 32 and away from the liner. This will serve to direct the late cycle combustion gases towards piston bowl 32. Orifice 42, however, can be directed in other ways and still enhance late cycle combustion.

Figure 6:
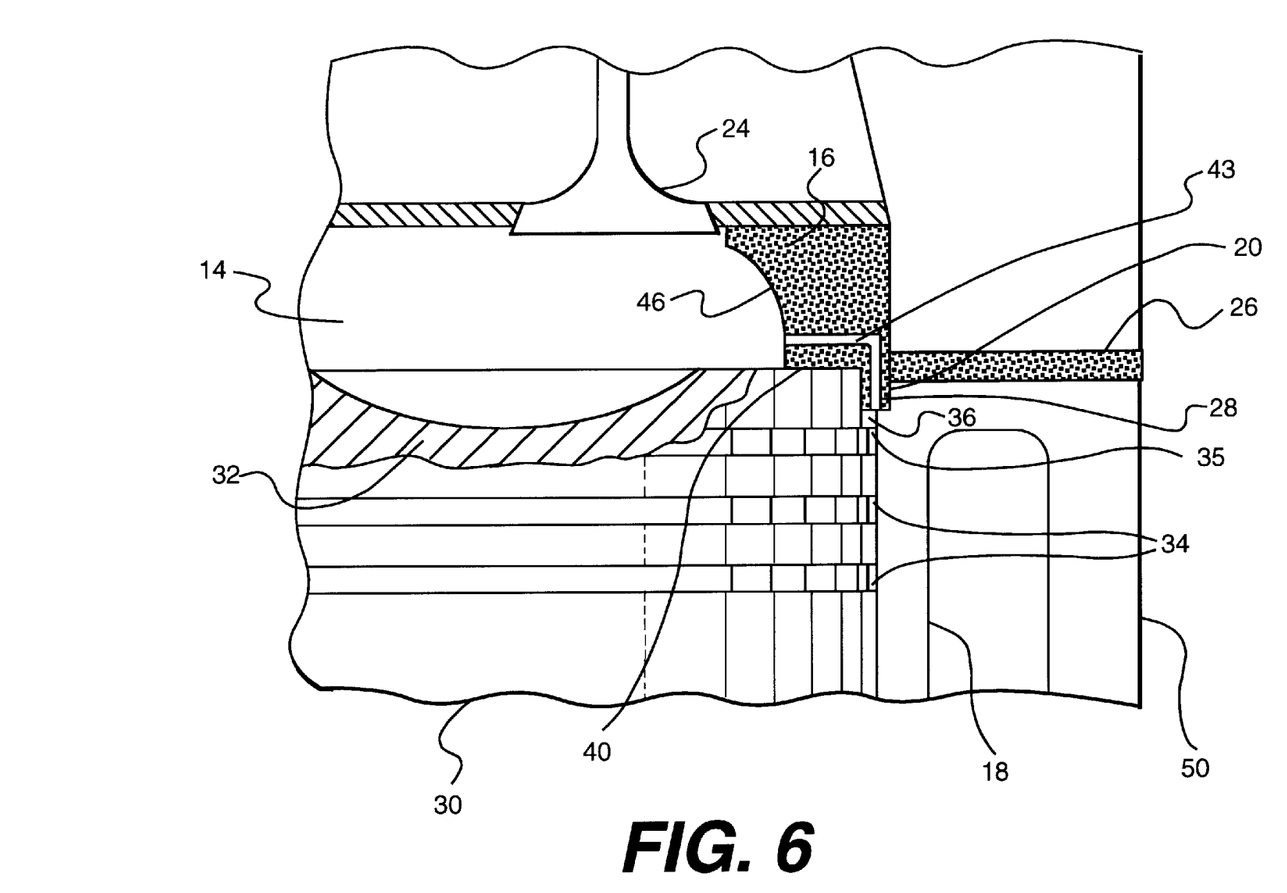
FIG. 6 is a cross-sectional view of a section of the cylinder of FIG. 1 incorporating the combustion enhancing insert according to a preferred embodiment of the present invention.

FIG. 6 shows another feature of the present invention wherein combustion enhancing insert 12 has at least one channel 43 therein extending from crevice area 36 to combustion area 14 so that crevice area 36 and combustion area 14 are in communication. It is known in the art that, as the piston begins to move up, pressure increases in crevice area 36. Because of the presence of combustion enhancing insert 12, the pressure in the crevice area at top dead center may be so high that top compression ring 35 may be damaged. According to the present invention, channel 43 will relieve the pressure in crevice area 36 exerted on top compression ring 35 since some of the high pressure air will jet through channel 43 into combustion area 14. This will also aid in the combustion of late cycle combustion gases.

FIG. 2 shows another feature of the present invention. It is desirable to have a circulatory flow of combustion gases within combustion area 14. Combustion gases, shown as arrows in FIG. 2, jet into combustion area 14 and are directed into circular piston bowl 32 which piston bowl 32 usually has an elliptical shape and directs the combustion gases towards the periphery of combustion area 14. When the combustion gases reach combustion enhancing insert 12, the combustion gases will be redirected along inside surface 21 of cylinder head 22 towards the center of cylinder 10. Upon reaching the center, the gases will be forced downwardly toward piston bowl 32 again to repeat this flow pattern. Thus, the combustion gases will have a circulatory flow. It is preferred that an inner wall 46 of combustion enhancing insert 12, adjacent to combustion area 14, have a curved-in shape, as shown, so as to promote such a circulatory flow. It is believed that the depicted shape of inner wall 46 will promote such a circulatory flow in that combustion gases will be directed towards the center of combustion area 14 where there are higher temperatures. This will result in better combustion and better fuel efficiency.

It is known in the art that there will be a "squish-jet" effect in the combustion area as piston 30 and cylinder head 22 move closer together. The squish jet effect is the presence of high pressure air in squish area 16 that will jet into combustion area 14 at top dead center. The squish jet effect enhances combustion and aids in promoting the circulatory flow of combustion gases. It is known that the less volume there is in squish area 16, the better the squish jet effect will be. As such, the presence of combustion enhancing insert 12 will enhance the squish jet effect since there will be less volume in squish area 16.

Figure 3:
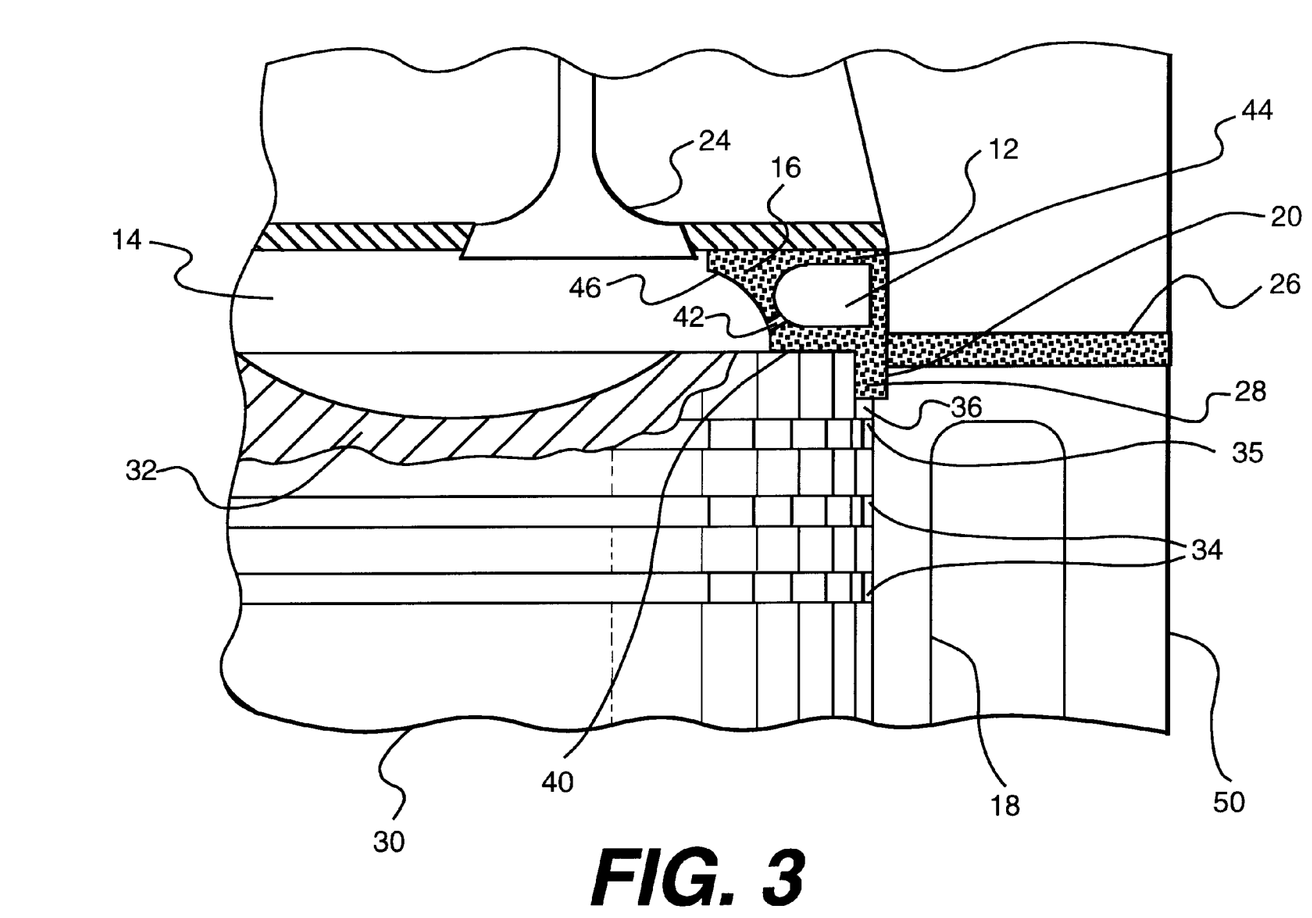
FIG. 3 is an enlarged view of a portion of the present invention as shown in FIG. 2.

As is shown in FIG. 3, combustion enhancing insert 12 may have a ridge 28 fitting into a recess 20 in cylinder wall 18. Combustion enhancing insert 12 may be stabilized in cylinder 10 by being seated in recess 20.

According to an alternate embodiment of the present invention, combustion enhancing insert 12 can be fabricated as part of a head gasket or with a flange 26 adapted to be captured between the engine block 50 and cylinder head 22. A typical head gasket is a sheet of sealing material that is normally placed between cylinder head 22 and engine block 50. Thus, the present invention can accomplish the same function as a gasket with the added function of enhancing combustion in the cylinder.

Figure 5:
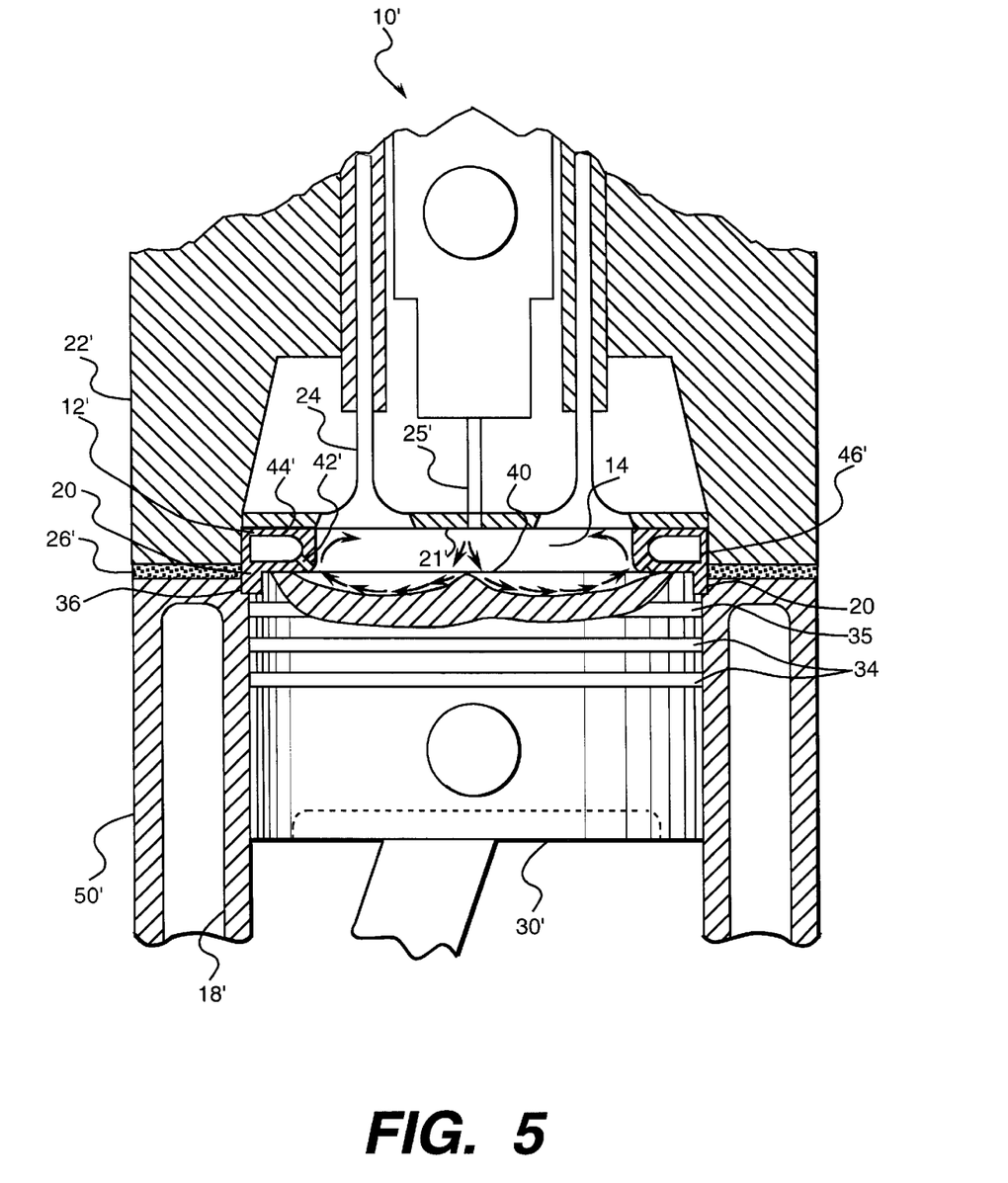
FIG. 5 is an alternate embodiment of the cylinder incorporating the combustion enhancing insert of FIG. 2.

As shown in FIG. 5, in an alternative embodiment of this invention, combustion enhancing insert 12' can be formed as part of a cylinder head 22'. In that case, cylinder head 22' would fit directly into recess 20 in cylinder wall 18'. If formed in this manner, combustion enhancing insert 12' should be of the same material as cylinder head 22.

It is also contemplated that a combustion enhancing insert, as described above, could be retrofitted to an existing internal combustion engine. The steps involved would be to remove the cylinder head, form a recess in the cylinder wall, set the combustion enhancing insert in the recess and reinstall the head.

It is understood that the combustion enhancing inserts can be made of many different materials such as a high temperature alloy or a ceramic. It is most preferable that combustion enhancing insert 12 be made of a material very similar to that of a head gasket. In any event, it is preferred, but not required, that combustion enhancing insert be made of a material that is softer than the piston. This is to ensure that if, by chance, the piston and combustion enhancing insert 12 should collide, the piston would not be damaged. Thus, it is a preferred feature of a combustion enhancing insert according to this invention that it will deform if contact is made with a piston. Obviously, a combustion enhancing insert should be made of a material that can withstand the high temperatures present in the combustion area of an internal combustion engine.

Since the present invention contemplates using a material that is relatively inexpensive, tremendous fuel efficiency and reduction of unburned combustion gases can be achieved inexpensively.

Those skilled in the art will appreciate that while some of the preferred and alternate embodiments of the present invention have been described fully to explain its principles, it is understood that various modifications may be made without departing from the scope of the invention. Accordingly, the following claims encompass all such modifications without departing from the scope of the invention.

What is claimed is:

1. A combustion enhancing insert for a cylinder of an internal combustion engine, said cylinder having a combustion area substantially surrounded by a squish area, said cylinder having a cylinder head with at least one valve therein opening into the combustion area, said combustion enhancing insert comprising a body having an overall shape for insertion into the cylinder so as to at least partially occupy said squish area, said body having at least one opening adjacent said at least one valve for passage of gaseous materials through said at least one valve and into or out of said combustion area wherein said body has at least one channel therein extending from said crevice area to said combustion area so that said crevice area and said combustion area are in communication.

2. The combustion enhancing insert of claim 1 wherein said cylinder has a reciprocating piston therein which forms a crevice area between itself and the cylinder and wherein said body is so shaped as to also at least partially occupy said crevice area.

3. The combustion enhancing insert of claim 1 wherein the body of the combustion enhancing insert is further shaped so as to at least partially extend into the combustion area from the squish area of the cylinder.

4. The combustion enhancing insert of claim 1 wherein said body has at least one orifice therein extending from the interior of said body toward the combustion area so as to be in communication therewith.

5. The combustion enhancing insert of claim 4 wherein said body has an inner chamber which communicates with the combustion area though said at least one orifice.

6. The combustion enhancing insert of claim 2 wherein the body has an inner wall adjacent said combustion area, said inner wall being shaped so as to promote a circulatory flow of combustion gases within the combustion area.

7. The combustion enhancing insert of claim 1 wherein the cylinder has a cylinder wall having a recess for receiving an insert and wherein said combustion enhancing insert is formed with a ridge configured to fit into said recess.

8. The combustion enhancing insert of claim 1 wherein the cylinder is formed in an engine block to which the cylinder head is removably attached and wherein the combustion enhancing insert is formed as part of a head gasket having a flange to be captured between the engine block and the cylinder head.

9. The combustion enhancing insert of claim 1 in combination with a cylinder head with which the combustion enhancing insert is integrally formed.

10. The combustion enhancing insert of claim 9 wherein the cylinder has a cylinder wall having a recess for receiving an insert and wherein said combustion enhancing insert is formed with a ridge configured to fit into said recess.

11. A method of enhancing combustion and increasing compression ratio in a cylinder of an internal combustion engine, said cylinder having a combustion area substantially surrounded by a squish area, said cylinder having a cylinder head with at least one valve therein opening into the combustion area, said cylinder having a cylinder wall, said method comprising:
   providing a combustion enhancing insert having a body shaped for insertion into said cylinder so as to at least partially occupy said squish area; and,
   inserting said combustion enhancing insert into said cylinder wherein said body has at least one channel therein extending from said crevice area to said combustion area so that said crevice area and said combustion area are in communication.

12. The method of claim 11 wherein said body has at least one opening adjacent said at least one valve.

13. The method of claim 11 wherein said cylinder has a reciprocating piston therein which forms a crevice area between itself and the cylinder and wherein said body is so shaped as to also at least partially occupy said crevice area.

14. The method of claim 11 wherein the body of the combustion enhancing insert is further shaped so as to at least partially extend into the combustion area from the squish area of the cylinder.

15. The method of claim 11 wherein said body has at least one orifice therein extending from the interior of said body toward the combustion area so as to be in communication therewith.

16. The method of claim 15 wherein said body has an inner chamber which communicates with the combustion area though said at least one orifice.

17. The method of claim 13 wherein the body has an inner wall adjacent said combustion area, said inner wall being shaped so as to promote a circulatory flow of combustion gases within the combustion area.

18. The method of claim 11 further comprising the steps of:

removing said cylinder head;

shaping said cylinder wall so as to have a recess for receiving an insert;

forming said combustion enhancing insert with a ridge configured to fit into said recess;

inserting said combustion enhancing insert so that said ridge fits into the recess; and placing said cylinder head back on said cylinder.

19. The method of claim 11 wherein the cylinder is formed in an engine block to which the cylinder head is removably attached further comprising the steps of:

removing said cylinder head;

shaping said cylinder wall so as to have a recess for receiving an insert;

forming said combustion enhancing insert with a ridge configured to fit into said recess and a gasket having a flange to be captured between the engine block and the cylinder head;

inserting said combustion enhancing insert so that the gasket is captured between the engine block and the cylinder head and the ridge fits into the recess; and placing said cylinder head back on said cylinder.

20. The method of claim 11 wherein the step of providing a combustion enhancing insert includes forming said combustion enhancing insert integrally with said cylinder head further comprising the steps of:

shaping said cylinder wall so as to have a recess for receiving an insert; and forming said combustion enhancing insert with a ridge configured to fit into said recess;

inserting said combustion enhancing insert so that said ridge fits into the recess.

21. The method of claim 12 wherein the step of providing a combustion enhancing insert includes forming said combustion enhancing insert integrally with said cylinder head further comprising the steps of:

shaping said cylinder wall so as to have a recess for receiving an insert; and forming said combustion enhancing insert with a ridge configured to fit into said recess;

inserting said combustion enhancing insert so that said ridge fits into the recess.

\* \* \* \* \*